United States Patent [19]
Northcutt

[11] 4,318,447
[45] Mar. 9, 1982

[54] DIET SCALE WITH WEIGHT PROGRESS INDICATOR

[76] Inventor: Michael E. Northcutt, 470 E. Calaversa, Milpitas, Calif. 95035

[21] Appl. No.: 104,764

[22] Filed: Dec. 18, 1979

[51] Int. Cl.³ .......................................... G01G 19/44
[52] U.S. Cl. ................. 177/25; 177/DIG. 3; 364/567
[58] Field of Search ............... 177/25, DIG. 3; 364/567, 415, 413, 568

[56] References Cited

U.S. PATENT DOCUMENTS

| | | | |
|---|---|---|---|
| 2,913,238 | 11/1959 | Tommenvik . | |
| 3,154,159 | 10/1964 | Gardner | 177/12 X |
| 3,469,645 | 9/1969 | Prodi | 177/210 |
| 3,512,593 | 5/1970 | Edmondson | 177/10 X |
| 3,550,705 | 12/1970 | Hoffman | 177/210 |
| 3,565,194 | 2/1971 | Engle | 177/50 |
| 3,572,584 | 3/1971 | Weaver | 235/88 |
| 3,655,003 | 4/1972 | Yamajima | 177/173 |
| 3,665,169 | 5/1972 | Henderson | 177/25 X |
| 3,667,561 | 6/1972 | Hutchinson | 177/245 |
| 3,812,923 | 5/1974 | Rock | 177/1 |
| 3,866,699 | 2/1975 | Soehnle | 177/34 |
| 3,888,321 | 6/1975 | Wiiki | 177/165 |
| 3,967,690 | 7/1976 | Northcutt | 177/25 |
| 4,015,677 | 4/1977 | Silva | 177/165 |
| 4,113,039 | 9/1978 | Ozaki | 177/25 |

Primary Examiner—Joseph W. Hartary
Attorney, Agent, or Firm—Schuyler, Banner, Birch, McKie & Beckett

[57] ABSTRACT

An electronic digital readout diet scale for measuring and displaying weight information. A microcomputer is used to enable a dieter to enter a diet program having an objective weight and a given time interval. The scale will indicate the amount of weight to be lost or gained in order to achieve the objective weight as well as the deviation between the current weight and the projected weight according to the diet program.

29 Claims, 19 Drawing Figures

FIG. I.

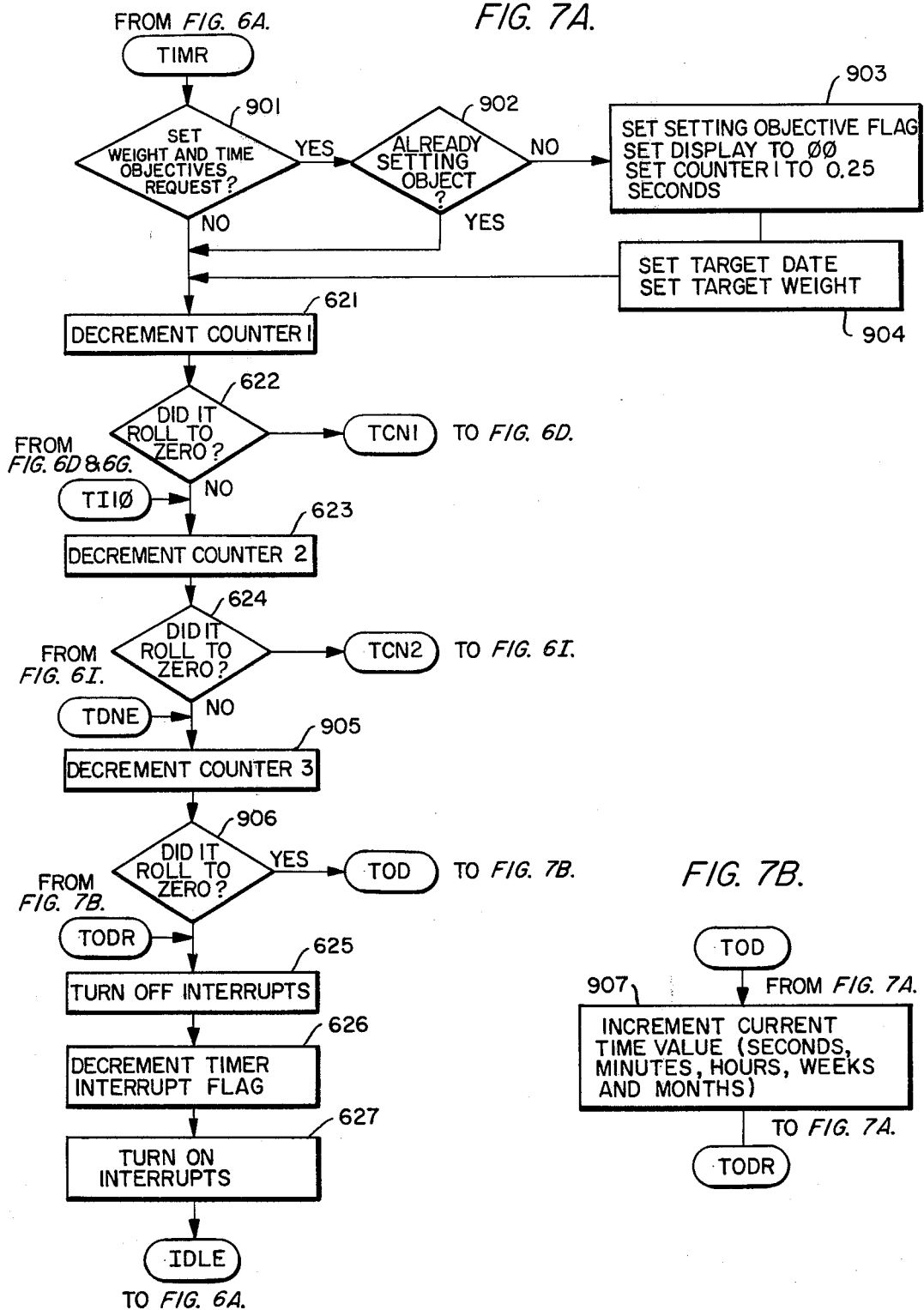

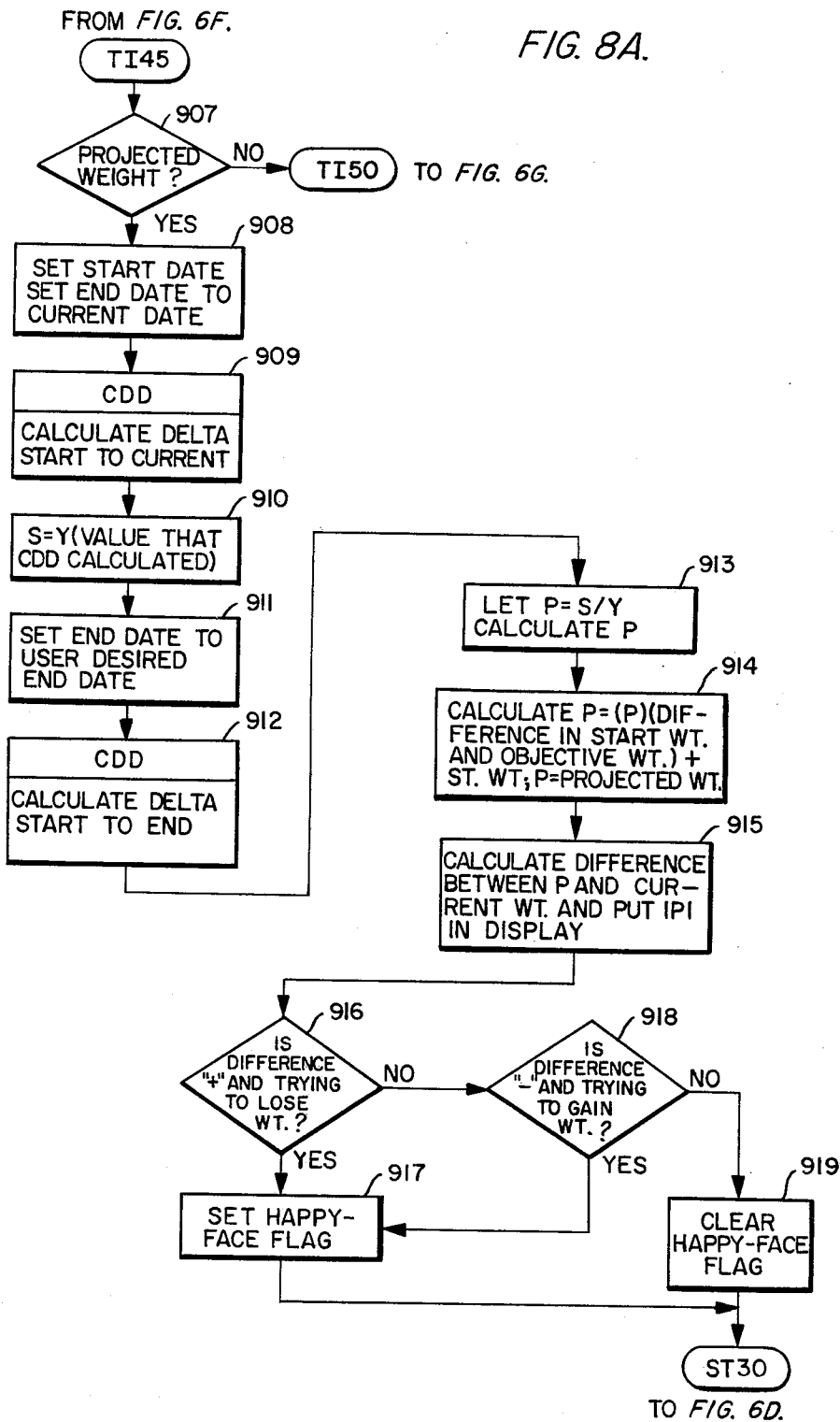

DIET SCALE WITH WEIGHT PROGRESS INDICATOR

BACKGROUND OF THE INVENTION

The present invention is directed to an electronic digital readout diet scale for measuring and displaying weight information.

Present bathroom and other scales generally are a very poor aid to weight control because they do not provide any psychological reinforcement to dieters because the scales do not indicate the progress being made after several days of dieting. In other words, these scales are unable to detect and indicate progress made as a result of a diet program.

A prior art diet scale is shown in U.S. Pat. No. 3,967,690 which issued on July 6, 1976 to the inventor of the present invention. The subject matter of that patent is hereby incorporated by reference. U.S. Pat. No. 3,967,690 discloses a digital readout diet scale which accurately measures and displays changes in the weight of a dieter. The present or current weight of a dieter is measured and this weight is then compared to a previous weight in order to determine the change in weight. A circuit arrangement is disclosed for accomplishing these weight measurements.

The present invention is an improvement of the digital readout diet scale of the type disclosed in the above United States patent. In the present invention, all the hardwired circuitry of the above patent has been eliminated. This invention also contemplates several additional functions. In particular, as set forth below, a microcomputer is used to perform the various functions previously performed by the discrete components of the above patent. In addition, the diet scale of the present invention enables a dieter to enter a diet program in the microcomputer having an objective weight and given time interval and the diet scale will indicate the amount of weight to be lost or gained in order to achieve the objective weight as well as the deviation between the current weight and the projected weight according to the diet program.

SUMMARY OF THE INVENTION

It is a primary object of the present invention to provide a diet scale which indicates the progress of a dieter in achieving a diet program. This scale allows a dieter to set a goal (such as losing 15 lbs. in 30 days. This is a fundamental psychological necessity to any diet program. In particular, it is an object of the present invention to provide a diet scale by which the dieter can enter an objective weight and the diet scale will indicate the amount of weight to be gained or lost to achieve the objective weight and the change in weight as a function of time.

It is a further object of the present invention to provide a diet scale which utilizes a programmed microcomputer to perform various functions thereby eliminating discrete components.

A diet scale with weight progress indicator is disclosed which enables a dieter to establish a diet program having an objective weight and a given time interval. The objective weight can be set by hand through a keyboard or an advance button/switch which actuates an up/down counter or, in the case of weight loss, the objective weight can be set by switching the scale to the set mode and the dieter placing one foot on the scale and depressing the scale until the objective weight is reached. In the latter event, the scale can register and retain a set weight by the dieter holding the platform fixed at the desired weight for a short period of time. The weight progress indicator can sequentially indicate the weight change since one or more previous weighings, the amount of weight still to be lost or gained in order to achieve the objective weight and the change in weight as a function of time. The time interval of the diet program can be either an automatic fixed time interval or it can be adjusted by the dieter. The scale also provides a digital readout of the current weight. Therefore, the dieter can readily determine any progress in achieving the objective weight of the diet program.

The diet scale comprises an input device, such as an optical weight sensor or a force voltage transducer, which generates a weight signal related to the current weight of the dieter. This signal is supplied to a microcomputer which includes a processing unit for processing data and a memory for storing information. The memory stores weight information on a plurality of dieters including the start weight, the weight of each dieter as of the last weighing, the objective weight set by the dieter, the time interval of the diet program, the direction of weight change (gain or loss), etc. A selector switch is connected to the microcomputer and operated by the dieter to enter information indicating which particular dieter is using the scale. The processing unit of the microcomputer processes the weight signal from the input device and the weight information stored in the memory in accordance with a program stored in memory. The processing unit calculates the current weight, the change in weight from the last weighing, the change in weight from the start weight and the amount of weight to be lost or gained to achieve the objective weight. The processing unit also calculates the change in weight as a function of time. In particular, the processing unit calculates the projected weight at the present point in time according to a diet program and the deviation from the projected weight. It can also calculate the time period remaining in the diet program and the weight loss per unit of time (average weight loss). Output signals are generated by the microcomputer representative of the above calculations which are supplied to a display which indicates the current weight, the change in weight since one or more previous weighings, the change in weight since the start weight, the amount of weight to be lost or gained to achieve the objective weight, the projected weight and the deviation from the projected weight. The weights may be shown to at least the nearest pound, or, in some embodiments, may measure weight in ½ pound or in 1/10 pound increments, or even in 1 ounce increments.

BRIEF DESCRIPTION OF THE DRAWINGS

FIGS. 7A-7B and 8A-8B are flow diagrams of modifications of the program to enable the diet scale to measure the deviation between the current weight and the projected weight of the diet program as a function of time.

DETAILED DESCRIPTION OF THE INVENTION

Figure 1:
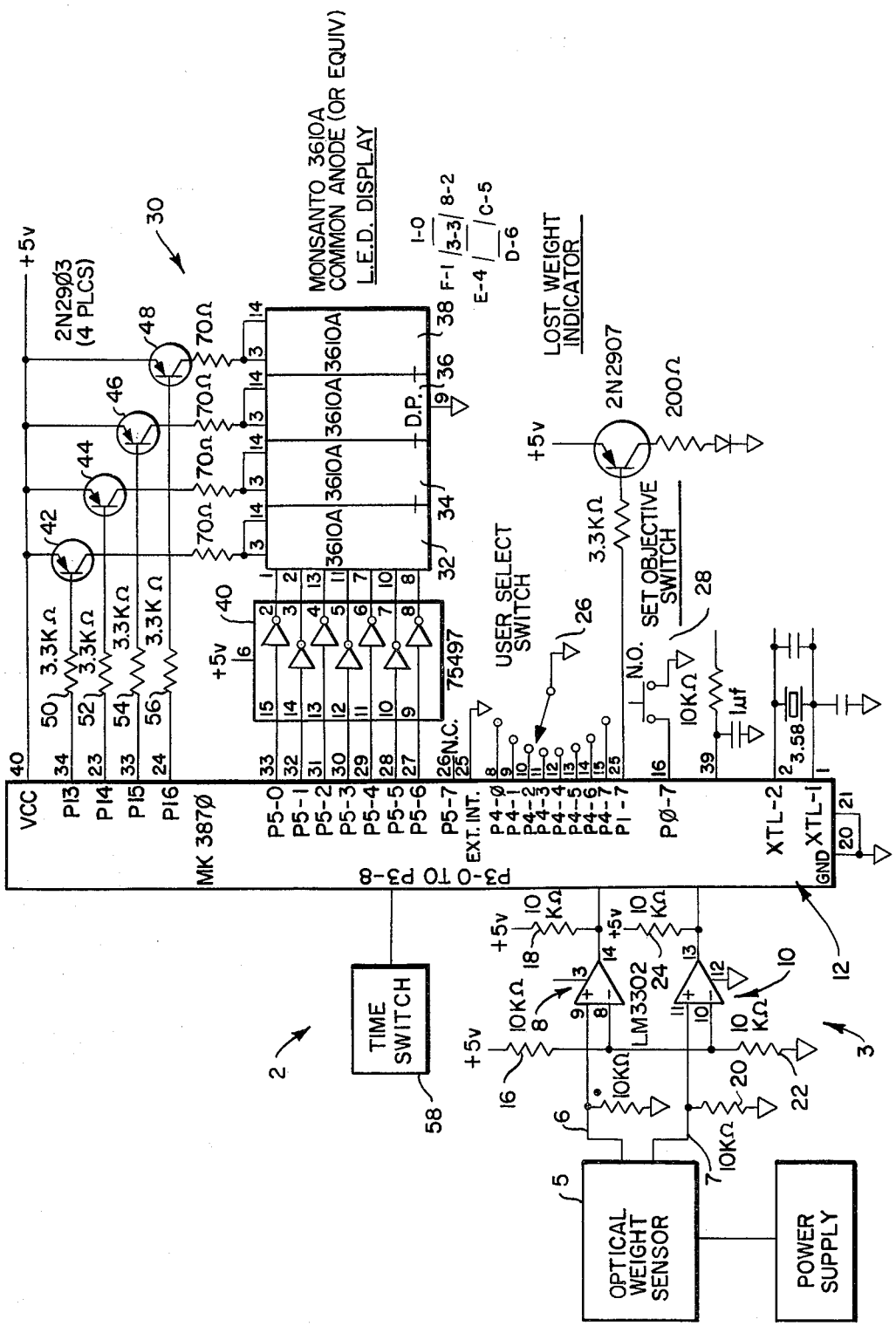
FIG. 1 is a schematic diagram of the circuit arrangement for the diet scale with the weight progress indicator of the present invention.

Referring now to FIG. 1, a diet scale with weight progress indicator 2 is shown which measures the current weight, the change in weight from the last weighing together with an indication of the direction of weight change, the amount of weight to be lost or gained in order to achieve the objective weight and the change in weight as a function of time. The scale includes a weight input device 3 which is coupled to the scale platform (not shown) of the diet scale. When the dieter steps on the scale platform, a switch is closed to connect the power supply 4 to the optical weight sensor 5, a force is applied to the scale platform and the optical weight sensor generates input signals on input lines 6 and 7 of FIG. 1.

In an alternative embodiment, the weight input device 5 may be a force transducer of the type described in U.S. Pat. No. 3,967,690 issued to the above named inventor on July 6, 1976. The force transducer disclosed in this patent is hereby incorporated by reference. The force transducer, which generates a voltage difference proportional to the current weight of the dieter, can supply input signals to the microcomputer 12 of the present invention.

Figure 2:
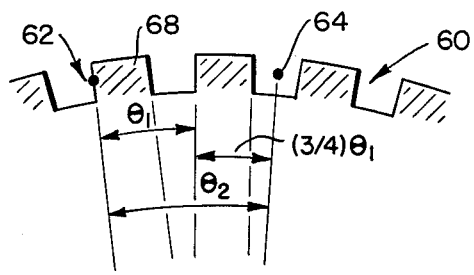
FIG. 2 is a top view of an optical weight sensor according to the present invention.
Figure 3:
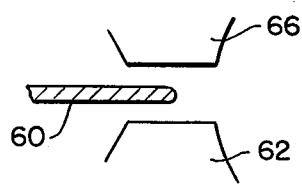
FIG. 3 is a side view of the optical weight sensor of FIG. 2.
Figure 4:
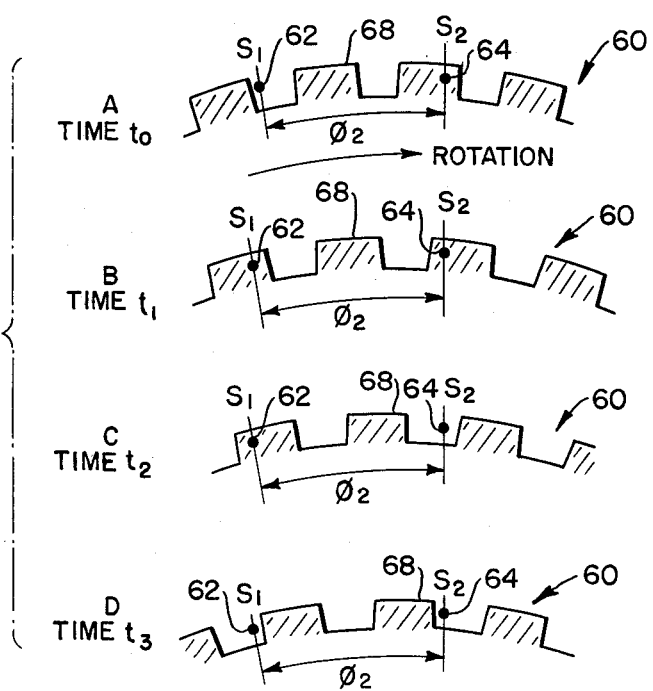
FIG. 4 is a time diagram of the positions of the optical weight sensor of FIG. 2.

In the preferred embodiment, the input device 3 includes an optical weight sensor 5 which is illustrated in further detail in FIGS. 2-4. The optical weight sensor 5 includes a disk 60 and a pair of photoelectric sensors 62 and 64. A photo emitter 66 is associated with each of the photoelectric sensors 62 and 64 as illustrated in the side view of FIG. 3. The photoelectric sensors 62 and 64 are mounted to a fixed reference with a 90 degree phase shift between them as illustrated in FIG. 2. The disk 60 includes blocking portions 68 which block light from the photo emitter 66. On the other hand light passes from the photo emitter 66 to the photoelectric sensors 62 and 64 in the open areas of the disk 60.

The photoelectric sensors 62 and 64 are connected to the input lines 6 and 7 of the input device 3 of FIG. 1. As shown in FIG. 1, the voltage signal on line 6 is coupled to a voltage comparator 8 which compares this voltage signal with a reference voltage to generate an output signal which is coupled to the microcomputer 12. Similarly, the voltage signal on line 7 is coupled to a voltage comparator 10 which compares this voltage signal with the same reference voltage. The output of the voltage comparator 10 is also coupled to the microcomputer 12. The reference voltage is supplied by a 5 volt power supply which is connected to the voltage comparators 8 and 10 through resistors 16 and 22. The inputs from the transducer to the voltage comparators 8 and 10 are further biased by resistors 14 and 20 and the outputs of these voltage comparators are biased by resistors 18 and 24 which are connected to the 5 volt supply.

The input device 3 provides input signals to the microcomputer 12 which translates the light signals or lack thereof in the optical weight sensor 5 into a digital signal. For example, light transmission between the photo emitter 66 and one of the photoelectric sensors 62 or 64 causes a logic one value whereas the absence of light transmission causes a logic zero value. If we assume that the rotating disk 60 in FIG. 2 rotates in a clockwise direction, each sensor 62 and 64 will provide an input signal that changes from a logic 1 to a logic 0 in accordance with the position of the rotating disk 60. As illustrated in FIGS. 4A-4D, a sequence of logic signals are generated by the sensors 62 and 64 starting from time t0 through time t3. Similarly, if the disk 60 is rotating in a counterclockwise direction, the logic signals would occur in reverse order. The following tables illustrate the clockwise and counterclockwise sequences of logic signals generated in FIGS. 4A-4D in which S1 corresponds to sensor 62 and S2 corresponds to sensor 64.

| Clockwise Table | | Counterclockwise Table | |
|---|---|---|---|
| S1 | S2 | S1 | S2 |
| 0 | 0 | 0 | 0 |
| 0 | 1 | 1 | 0 |
| 1 | 1 | 1 | 1 |
| 1 | 0 | 0 | 1 |

For given sensor outputs, e.g., S1 equals 0 and S2 equals 0, the direction of rotation of the disk 60 is uniquely identified by the next value assumed by the outputs of the optical sensors 62 and 64. If the next value of S1 equals 0 and S2 equals 1, then the disk 60 has rotated clockwise by $\theta/4$ degrees. If the next value of S1 equals 1 and S2 equals 0, the disk 60 would have rotated counterclockwise by $\theta/4$ degrees. If it is assumed that each $\theta/4$ degrees of angular displacement represents a 1 pound change in measured weight, and it is further assumed that an increase in weight causes rotation in one direction while a decrease causes rotation in other direction, then it is possible, by monitoring every transition of the logic valves generated by the optical sensors 62 and 64, to determine the total weight on the scale at any point of time with a precision of 1 pound. The precision of the measurement is equal to the amount of weight required to produce an angular displacement of $\theta/4$ degrees.

Based on the above assumptions together with the clockwise and counterclockwise sequences shown in the above tables, a change in logic values input to the microcomputer 12 can immediately be translated to the correct change in weight. This is done by constructing two tables in the memory of the microcomputer 12 as shown below. In both the Up Table and the Down Table below, the index is the last value of the input signal and the new value is the next value of the input signal if the change is in the increasing direction (Up Table) or the next value of the input signal if the change is in the decreasing direction (Down Table).

| Up Table | | Down Table | |
|---|---|---|---|
| Index | New Value | Index | New Value |
| 0 0 | 0 1 | 0 0 | 1 0 |
| 0 1 | 1 1 | 0 1 | 0 0 |
| 1 0 | 0 0 | 1 0 | 1 1 |
| 1 1 | 1 0 | 1 1 | 0 1 |

By assigning numerical weights to the input values generated by the sensors 62 and 64, and using the index values associated with the previous input signals, the current weight can be determined. If the new value of the input signals is equal to the value in the Up Table associated with the index, then the disk 60 has rotated the equivalent of one unit of resolution in the increasing weight direction. Similarly, if the new value of the input signals is equal to the value in the Down Table associated with the index, then the disk has rotated one unit of resolution in the decreasing weight direction. By adding or subtracting the unit of resolution to the stored net weight, the current net weight is obtained.

The microcomputer 12 is a standard microprocessing unit such as the MK3870 single chip MPU manufactured by Mostek. This microcomputer 12 includes read only memory, a random-access memory and a central processing unit for processing information in response to a program stored in the read only memory. The random access memory stores weight information on a plurality of dieters. In the preferred embodiment, the random access memory stores the start weight, the previous weight from the last weighing, the difference between the start weight and the previous weight, the objective weight set by the dieter and the direction change (gain or loss), the amount of weight to be lost or gained to achieve the objective weight, the time interval of the diet program and the deviation from the projected weight of the diet program. The projected weight is the calculated weight of the dieter as a function of the elapsed time and objective weight of the diet program, i.e., the projected weight equals the start weight plus a percentage of the objective weight loss or gain. The percentage is the percentage of the time interval of the diet program that has elapsed. Some of the weight information stored in the random access memory is first determined by the central processing unit by processing other weight information entered directly by the dieter as described in further detail below. It is contemplated that weight information on at least eight dieters can be stored in the random access memory of the microcomputer 12.

A dieter selector switch 26 is connected to the microcomputer 12 to enable the dieter to access the pertinent weight information stored in the random access memory which is related to that particular dieter. In other words, when the dieter selects one of the eight positions of the selector switch 26 and steps on the scale, weight information is accessed from the random access memory and the input device 3 supplies input signals to the microcomputer 12 through the voltage comparators 8 and 10. These input signals are processed by the central processing unit of the microcomputer 12 in response to the program stored in the read only memory and the current weight is calculated. The current weight can be accurately measured in 1 pound, ½ pound, 1/10 pound increments or it can be measured in metric units. Although values other than the current weight can also be measured by the present invention as described below, a simple manual switch can be provided in a manner apparent to those skilled in the art to enable the diet scale to only measure current weight.

After the pertinent weight information is identified by the position of the dieter selector switch 26, the central processing unit calculates the change in weight or the percentage change in weight between the current weight and the previous weight by accessing the previous weight from the random access memory and executing program instructions. Similarly, the central processing unit calculates the change in weight between the start weight and the current weight and between the start weight and the previous weight by executing program instructions and accessing the pertinent weight information from the random access memory. The central processing unit then stores the new weight information in the random access memory. The basic program steps required to perform the above operations are described in further detail below with reference to the flow diagram in FIGS. 5 and 6A-6J.

The diet scale of the present invention also indicates the amount of weight to be lost or gained in order to achieve the objective weight. The dieter first enters the objective weight in the microcomputer 12 by depressing an objective weight switch 28 which is connected to the microcomputer 12 as illustrated in FIG. 1. The objective weight switch 28 may be a manually actuated entry switch such as a conventional keyboard or a conventional automatic advance button which directly enters the objective weight. Automatic advance buttons are conventionally used to advance up/down counters until they reach an appropriate value. Alternatively, the objective weight switch 28 may be a push button switch which conditions the microcomputer to accept objective weight information from the input device. In other words, the dieter merely closes objective weight switch 28 and presses on the scale platform of the scale until the objective weight is indicated by the scale. The platform is then held in a fixed position at the objective weight for a short period of time to enable the microcomputer 12 to enter this weight into the random access memory via input lines 6 and 7 as the objective weight. The dieter can then measure the amount of weight to be gained or lost to achieve the objective weight by stepping on the scale and the central processing unit accesses the objective weight and calculates the amount of weight to be lost or gained to achieve the objective weight. Again, entry of objective weight information and of weight changes are performed by execution of the program stored in the read only memory as further described below with reference to the flow diagram in FIGS. 5 and 6A-6J.

A display device 30 is connected to the microcomputer 12 as illustrated in FIG. 1. Although the display device 30 includes a plurality of light emitting diode display elements 32, 34, 36 and 38, other display elements could be used such as liquid crystal displays. The light emitting diode display elements are conventional display elements which contain 7 segments arranged to display the digits 0-9. A segment driver 40 is connected to the segment lines of the display elements 32, 34, 36 and 38 and each of the display elements is driven by a strobe driver consisting of transistors 42, 44, 46 and 48, respectively. Each of these strobe drivers includes a biasing resistor 50, 52, 54 and 56 connected to the bases of these transistors. The microcomputer 12 provides output signals to the segment driver 40 and the strobe driver transistors 42, 44, 46 and 48 to excite the light emitting diode display 32, 34, 36 and 38. These signals enable the display device 30 to display the current weight, the start weight, the weight of the last reading or the previous weight, the change in weight from the previous weight and the start weight together with an indication of the direction of the weight change, the objective weight, the amount of weight to be lost or gained to achieve the objective weight, the projected weight of the diet program and the deviation from the projected weight. A motivation display can also be provided by the display device 30 which would indicate that the dieter is "improving". Thus, the weight progress indicator of the present invention enables a dieter to set a goal, such as losing 15 pounds in 30 days, and determine whether the goal is being achieved on a regular basis.

Figure 5:
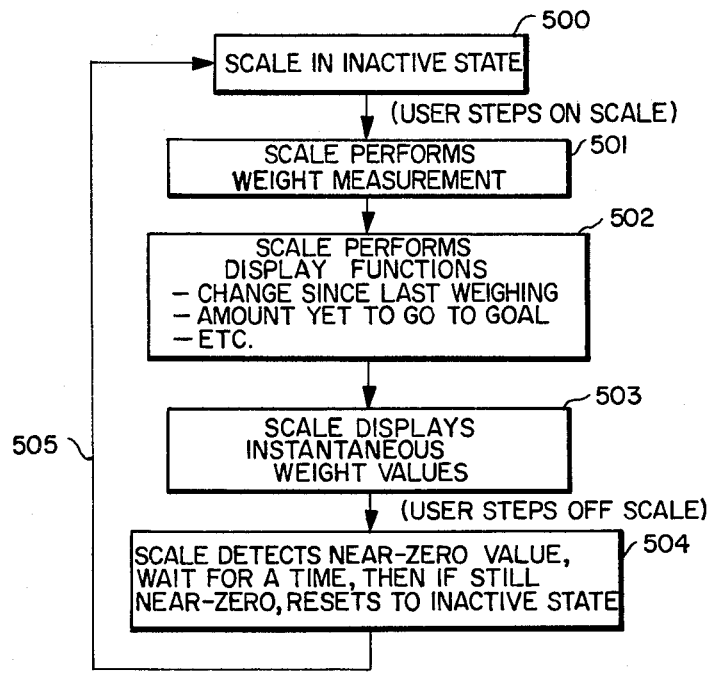
FIG. 5 is a general flow diagram of the overall operation of the diet scale.

Turning now to the flow diagram in FIG. 5, this flow diagram illustrates the general sequence of events in the operation of the diet scale of the present invention. When the scale is not being used, the microcomputer 12 is in the inactive state. Although a minimum amount of power is supplied to the microcomputer in order to maintain the weight information stored in the random access memory, the remaining elements of the diet scale are inactive. After the dieter steps on the scale, the diet scale enters the active state and a weight measurement is performed at step 501. The diet scale next performs the various calculations necessary to display weight information to the dieter as indicated in step 502. In step 503, the weight values are actually displayed on display device 30 of the diet scale and the dieter then steps off the scale. When the scale detects a near zero value, a delay period is executed at step 504 and, if the scale continues to detect a near zero value, the diet scale is reset to its inactive state as indicated by line 505 in FIG. 5.

The detailed flow diagram of the diet scale of the present invention is illustrated in FIGS. 6A–6J. Although the operation of the microcomputer 12 in accordance with these flow diagrams is apparent, the operation of the program will be briefly explained. Steps 601 and 602 of FIG. 6A indicate power turn on and initialization of the microcomputer. The program next enters the idle loop IDLE which is entered when the scale is not in use as well as during the time between changes in sensor values when the scale is in use. The idle loop IDLE is defined by steps 603–605. There are two conditions in the idle loop IDLE: (1) when the scale is not in use, the timer of timer loop TIMR is inactive and no branch is made to loop TIMR; (2) when the scale is in use, the timer of loop TIMR is active so that, at the end of each time interval, the timer in step 605 generates an interrupt signal.

Figure 6B:
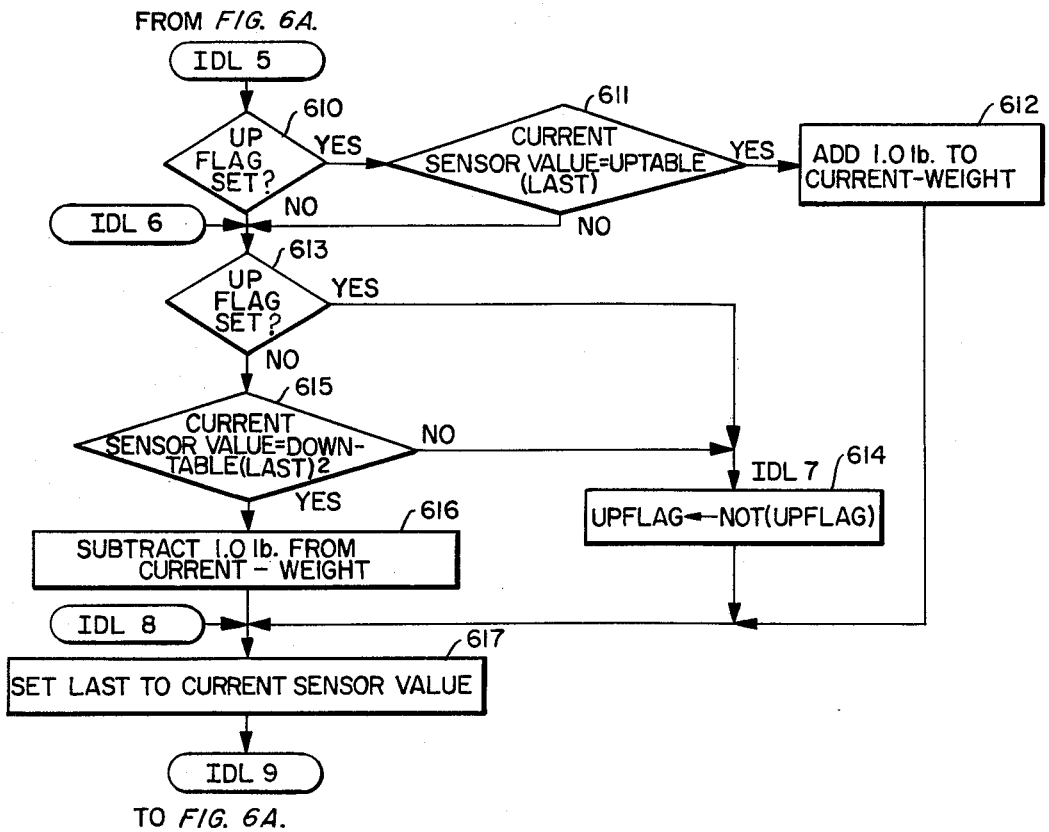
FIGS. 6A–6J are detailed flow diagrams of the program for the microcomputer of the diet scale of FIG. 1.
Figure 6A:
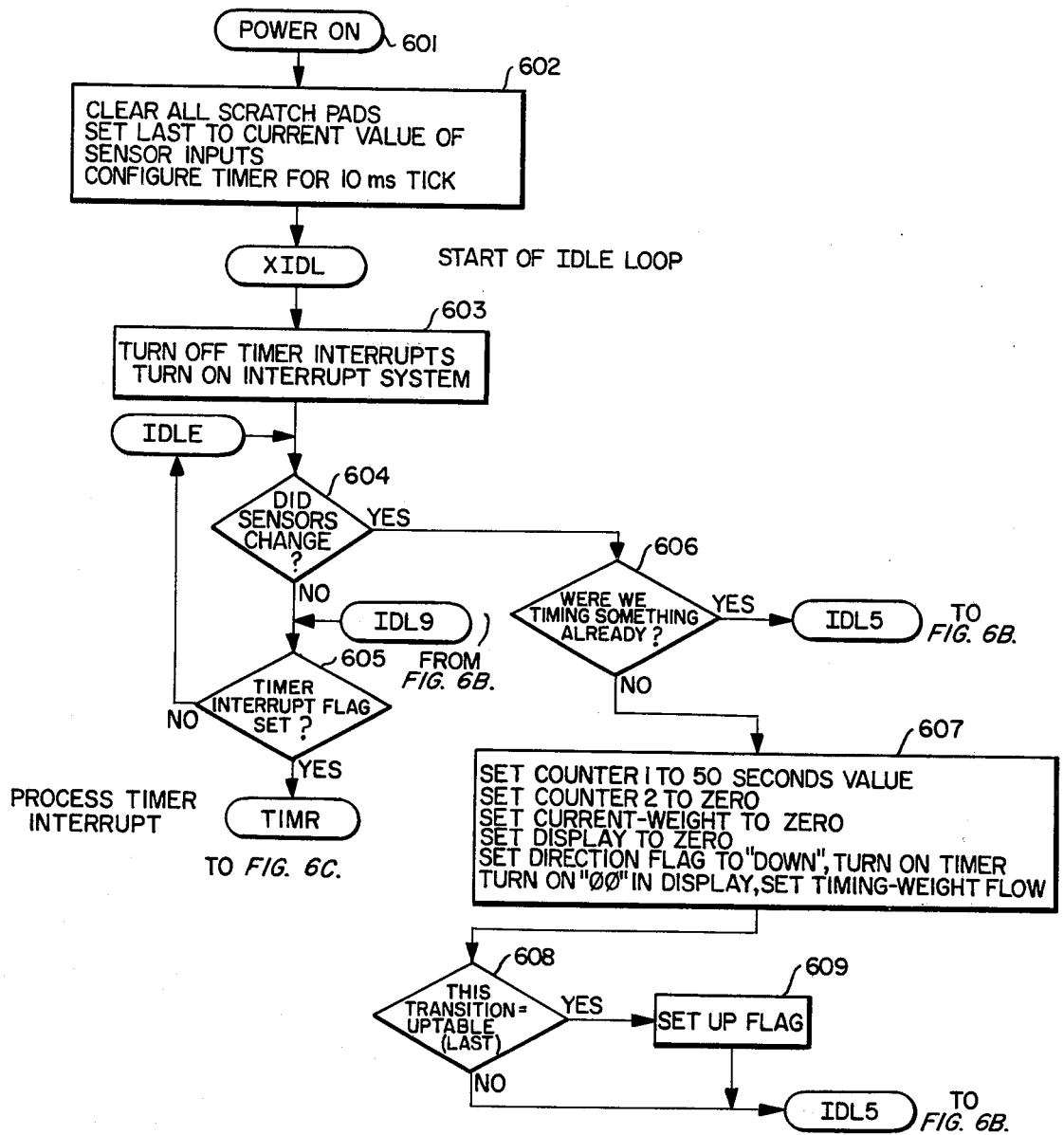
Figure 6C:
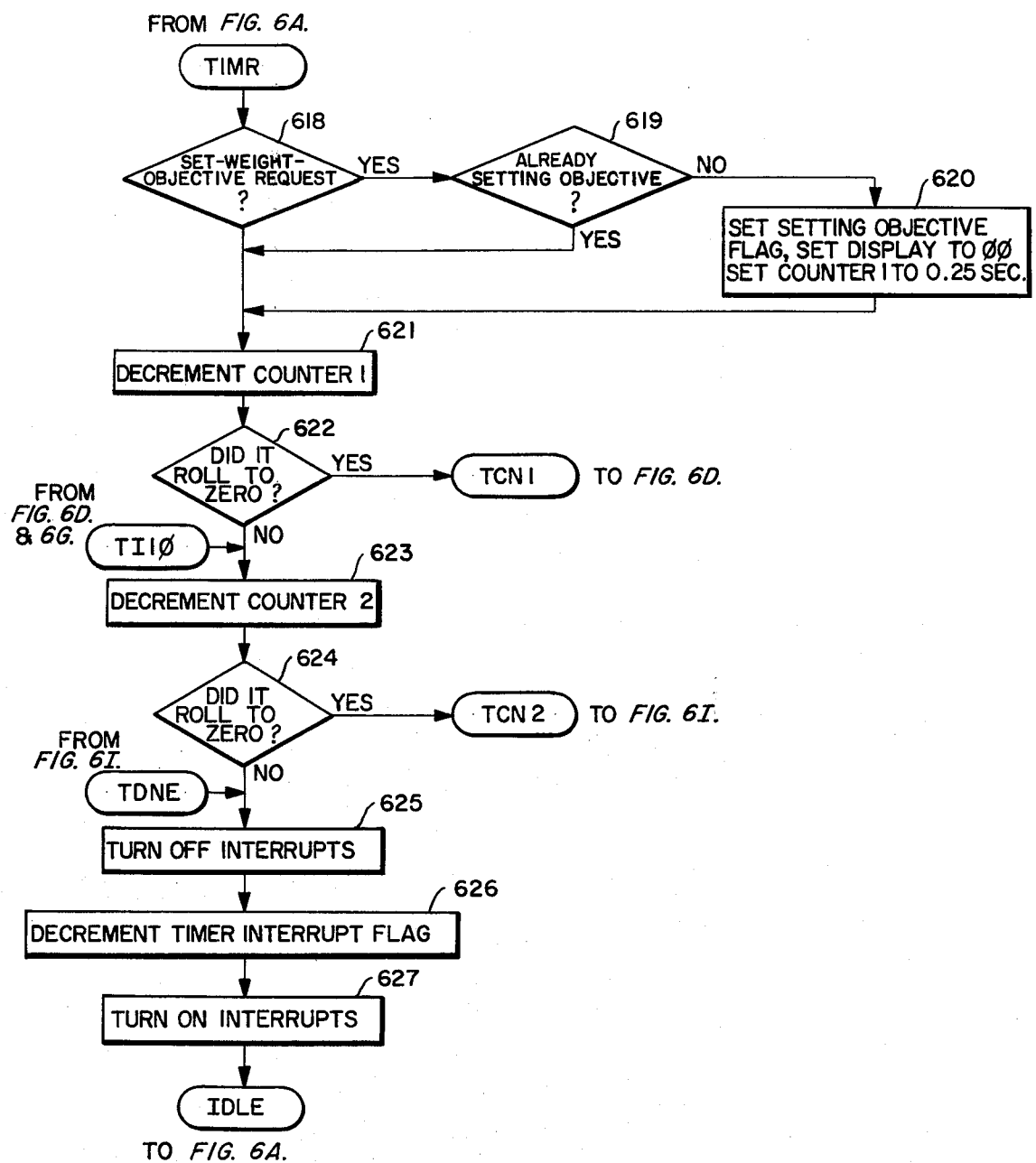
Figure 6D:
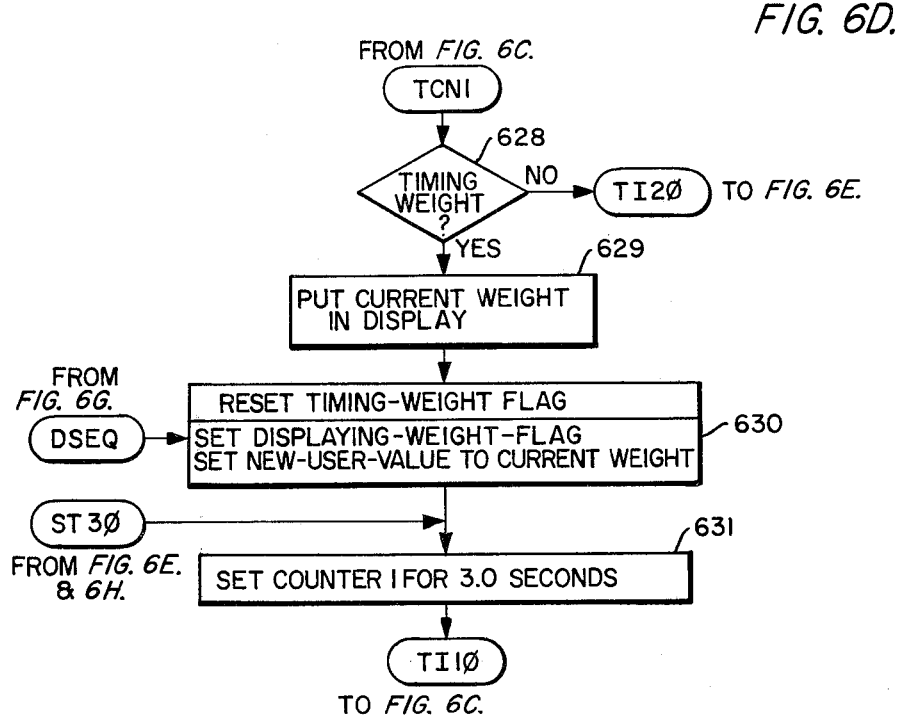
Figure 6F:
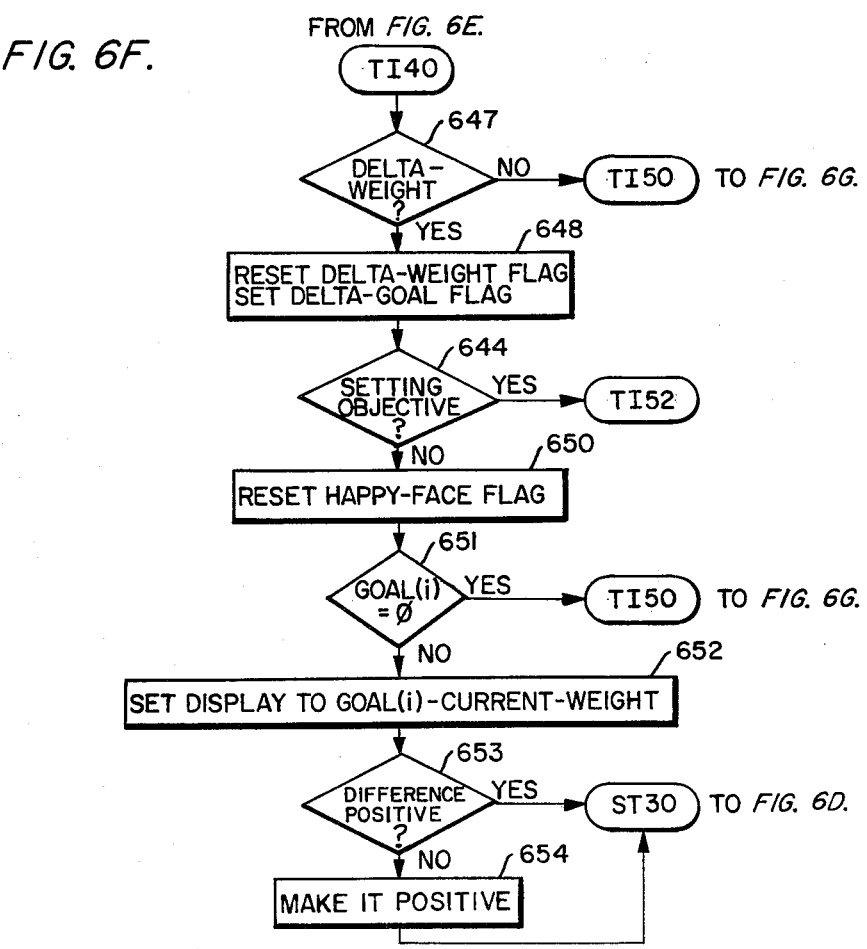
Figure 6E:
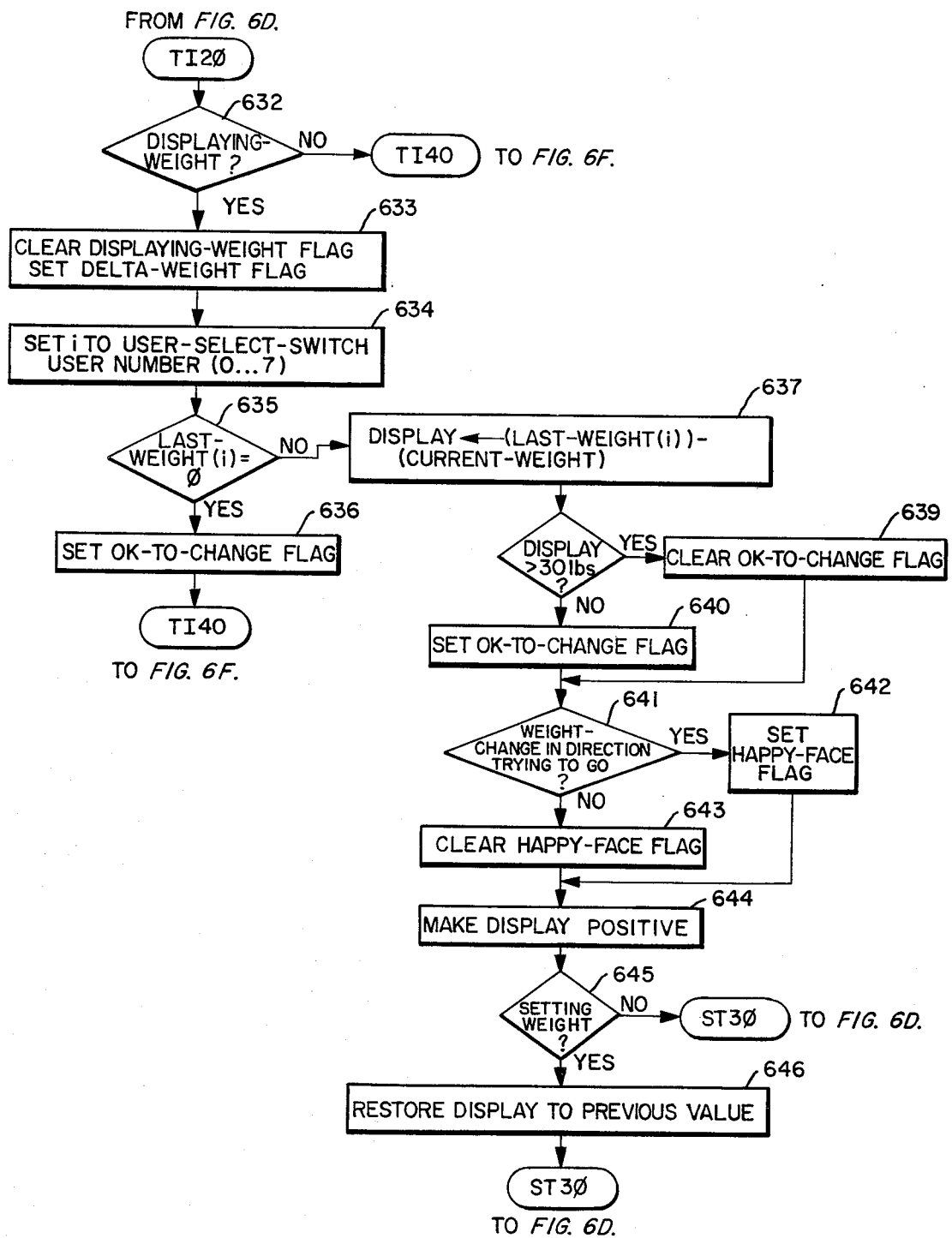
Figure 6G:
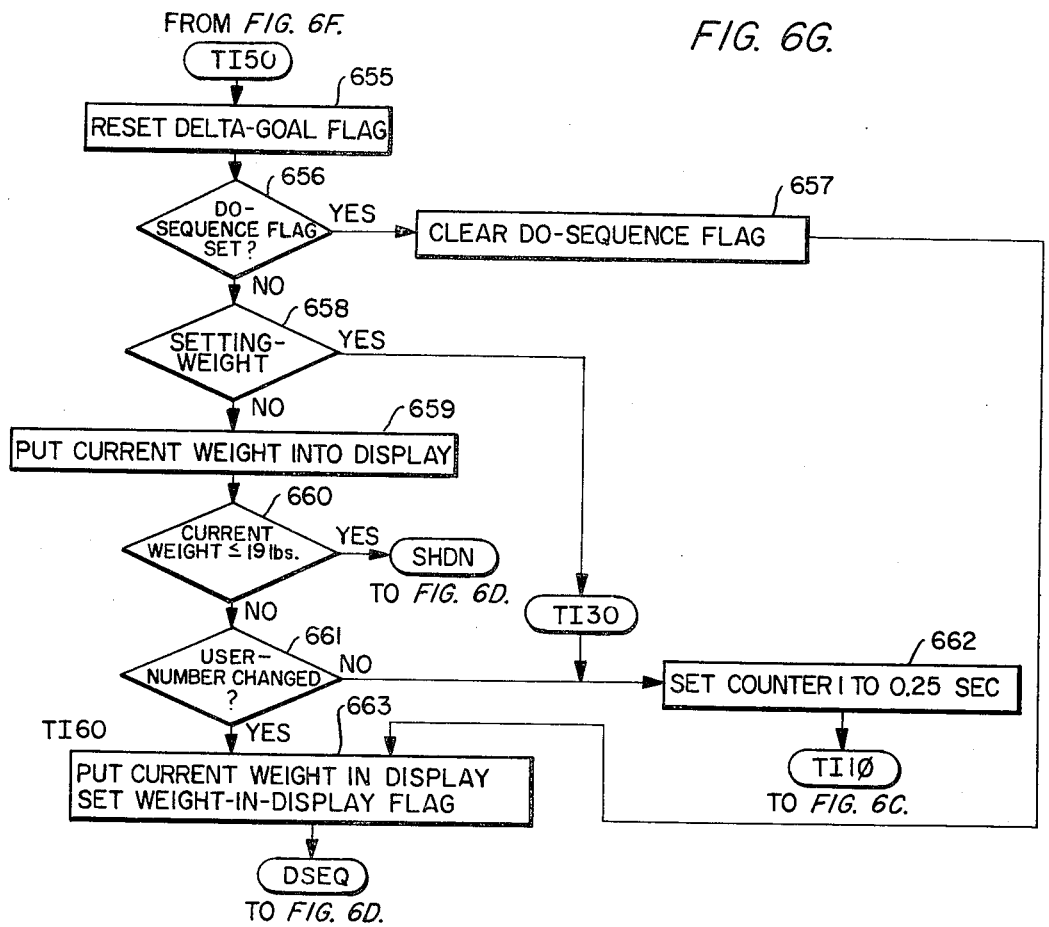
Figure 6H:
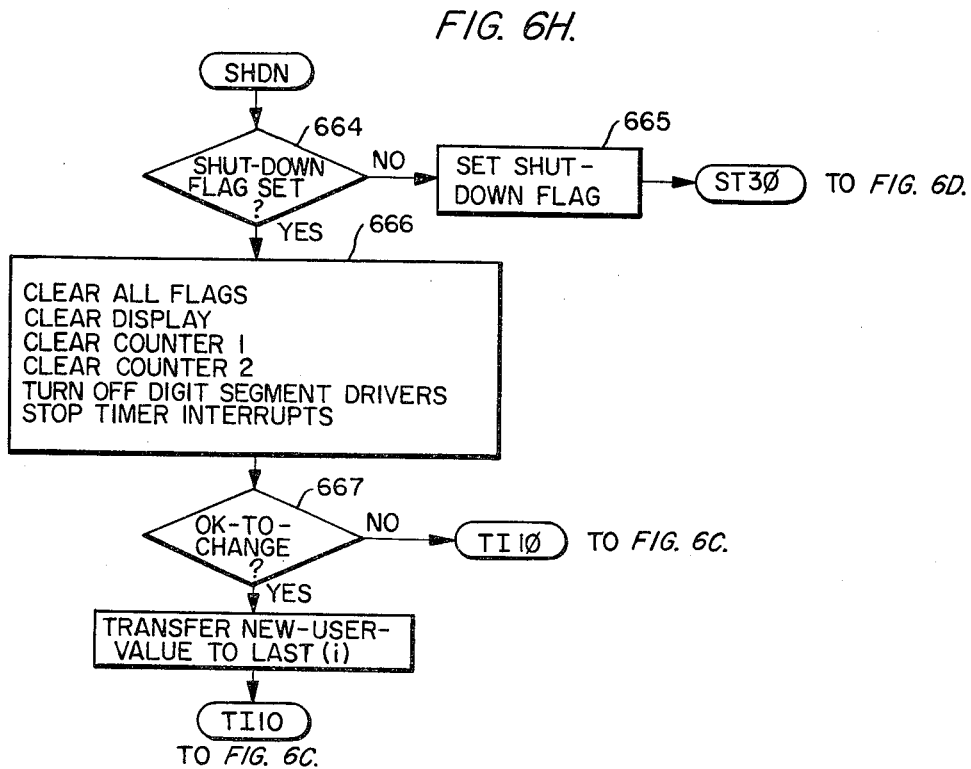
Figure 6I:
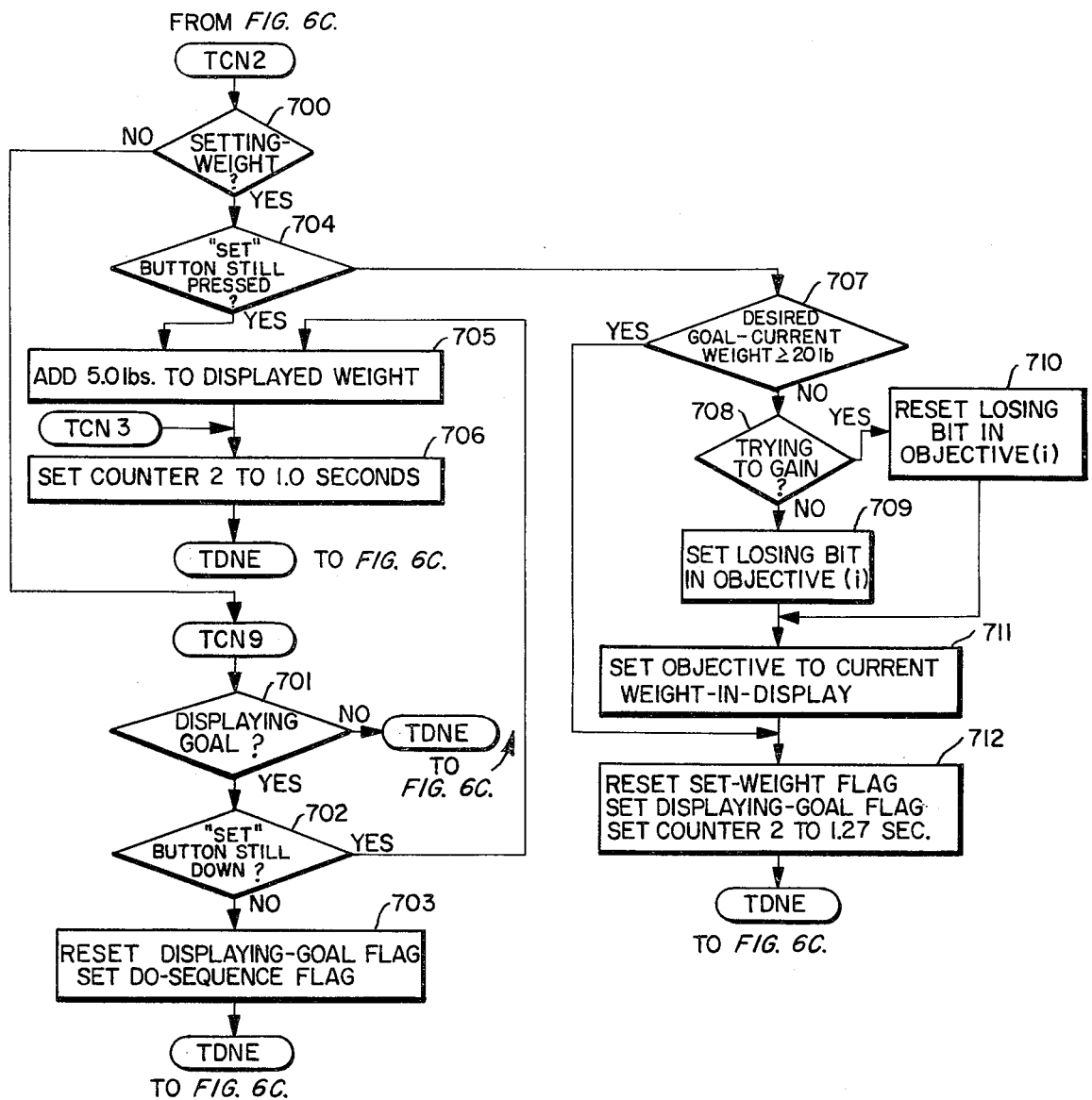
Figure 6J:
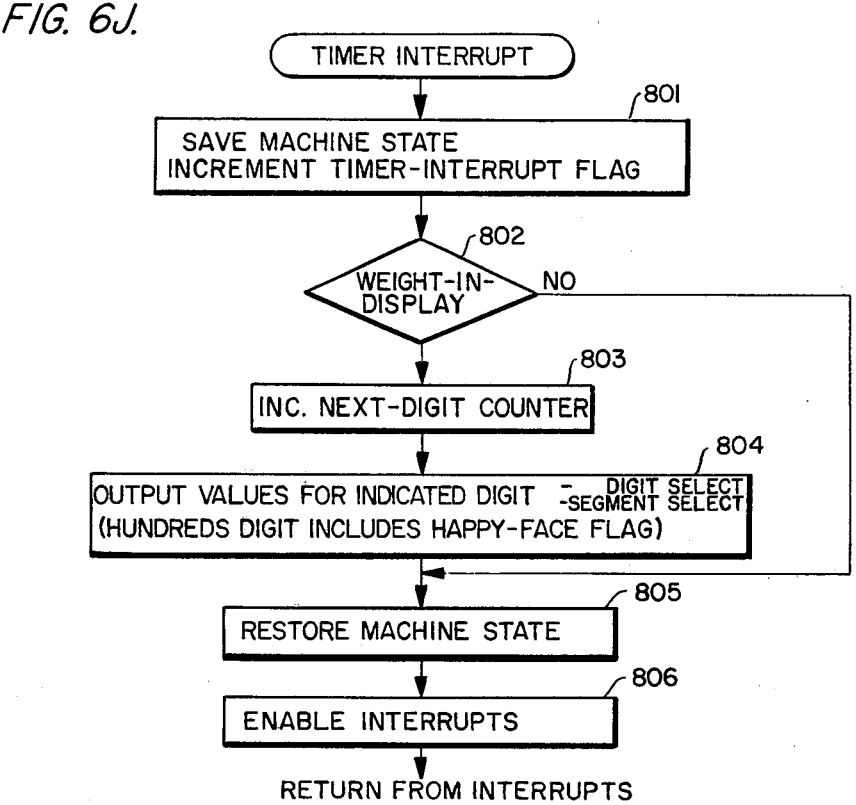

Upon the occurence of an interrupt signal, the processing by the central processing unit is suspended and the timer interrupt loop of FIG. 6J is executed. The branch to the timer interrupt loop in FIG. 6J is accomplished by the hardware circuitry of the microcomputer which sets a software flag in step 801. Upon executing steps 802–806 of FIG. 6J, the display, if it is active, is refreshed and the program returns to the idle loop IDLE in FIG. 6A. Thus, the normal condition of the scale when not in use is a repetitive execution of the idle loop IDLE of FIG. 6A.

The weight measurement of the diet scale is initiated by steps 606–609 of FIG. 6A and steps 610 ∝ 617 of FIG. 6B. In step 606, the timing flags are checked to determine whether the diet scale was previously in its inactive state. If the diet scale is inactive, all the timing flags are clear whereas, if the diet scale is active, at least one timing flag is set. As a result, when a sensor change is detected in step 604, if no timing flag is set, the previous state must have been inactive so that it is not necessary to switch to the active state. The counters and display are set in step 607 and the Up Table is checked in steps 608–609.

The operation of the diet scale to calculate the current weight was explained in detail above with reference to the optical weight sensor in FIGS. 2–4. Steps 610–617 of FIG. 6B are the programming steps associated with the operation of the optical weight sensor. In particular, in steps 611 and 612, one pound increments are added to the measured weight by comparing the logical value of the input signals with the up table stored in the random access memory. Similarly, in steps 615 and 616, one pound increments are subtracted from the total weight if the up flat in steps 610 and 613 is not set. The subtraction of one pound increments is done in accordance with the down table stored in the random access memory. The up table and the down table were described above in further detail. Thus, the program calculates the current weight by utilizing the up and down tables stored in the random access memory and comparing these tables to the sensor values input to microcomputer 12 from the optical weight sensor 5 of the input device 3.

Referring again to FIG. 6A, if the timer interrupt flag is set at step 605, the program enters the timer interrupt loop TIMR in FIG. 6C. The loop TIMR implements two software timers by executing steps 618–627. These software timers are used by the program to time the display of each successive weight value, the setting time of the weight measurement, etc. In the loop TIMR, only two timers are illustrated although the technique can be extended to other timers depending on the capacity of the random access memory. For example, a similar timer is used to time the time interval of the diet program as described in further detail below.

As a general illustration of the sequencing of the timer loop TIMR, let j represent the event number which will be timed. For example, the subroutines of FIGS. 6D–6G each represent an event number and branches are made to these subroutines in accordance with the following sequence. If j is set (logical 1) by the initialization routine during the transition of the diet scale from the inactive state to the active state, and the initialization routine sets the first timing flag and processes the first timing interval, such as the weight measurement timing interval of FIG. 6C, then the program branches to process the routine associated which event number j after the first timing interval times out. The timing flag j is then cleared and the timing flag (j+1) is set. The program then begins processing the timing interval (j+1) and the software timer is set for the duration of the timing interval (J+1). The event number j is then set to (j+1). By executing timing routines in the manner described above, various time intervals can be successively executed by the program.

The time intervals of the diet scale of the present invention are implemented by the processing steps 618–627 of FIG. 6C in conjunction with the processing steps in FIGS. 6D–6G. The first counter illustrated in step 621 of FIG. 6C is used to time a number of time intervals. For example, the program branches from step 622 to step 628 in FIGS. 6C to provide a five second time interval for the diet scale to reach equilibrium after the dieter steps on the scale. The current weight is then displayed at step 629 and the display is maintained for three seconds as determined by the second timing interval provided by the first counter in accordance with steps 630–631 of FIG. 6D.

If the program is not timing the time interval for the current weight, the program transfers from step 628 in FIG. 6D to the subroutine in FIG. 6E. The processing steps 632–646 of FIG. 6E display the change in weight for the particular dieter identified by the selector switch 626 unless the last weight of this particular dieter was zero. Also, if the difference is greater than 30 pounds, a flag is set inhibiting the update of the last weight value. The first counter again is used by the subroutine in FIG.

6E to display the change in weight since the last weight measurement for a timed period of 3 seconds before returning.

If the subroutine in FIG. 6E is not displaying a change in weight, a transfer takes place from processing step 632 to the subroutine in FIG. 6F in order to provide a time interval for measuring and displaying the difference between the objective weight and the current weight of the dieter. This display of the difference between the objective weight and the current weight is accomplished if the objective weight is not zero. Again, processing steps 647-654 in FIG. 6F operate in conjunction with the first counter in FIG. 6C to provide a 3 second time period to display the difference between the objective weight and the current weight.

Finally, the subroutine in FIG. 6F will transfer from step 647 to the subroutine in FIG. 6G if the program is not displaying the difference between the objective weight and the current weight. The processing steps 655-663 of FIG. 6G display the current weight for 0.25 seconds and check to determine if the selector switch 26 has changed position in the interim. If the selector switch 26 has changed position, the sequence is repeated. However, if the current weight drops below a certain threshold which is set at 19 pounds as indicated by steps 660 of FIG. 6G, then the program shuts down by transferring to the subroutine SHDN in FIG. 6H. In summary, the subroutines in FIGS. 6D-6G are sequentially executed by checking a flag at the start of each of these subroutines. If the flag is set, then the timeout associated with that particular subroutine is executed. If the flag is not set, the next flag is checked in the subsequent subroutine.

Turning back to FIG. 6C, the second counter shown in step 623 is used to provide independent timing for the objective weight setting procedure. At any point and time during the execution of the program, the dieter may enter the objective weight by setting the objective switch 28. When the objective switch 28 is set, the objective weight setting procedure preempts the execution of the program as described above. When the objective weight is entered, the due sequence flag in step 656 of FIG. 6G is set which requests that the sequence index j be set to 2 and the entire sequence described above is repeated based on the new value of the objective weight. The second counter forms a second timer which is used to pace the increment interval on the objective weight which is being displayed. Similarly, third, fourth, etc., timers could be implemented in this fashion to provide as many independent timers as required. These timers could be used to perform such functions as current time of day counting, time intervals since last weighing, etc. In fact, as further described below, additional timers are used to enable the diet scale of the present invention to indicate projected weight according to a diet program as well as the deviation from the projected weight at any point and time.

The shut down loop SHDN is shown in FIG. 6H as steps 664-668. This shut down loop controls the transition from the active state to the inactive state of the diet scale. This loop SHDN is entered when the current weight drops below the threshold value, e.g., 19 pounds as established by steps 660 of FIG. 6G, which sets a shutdown flag and starts an internal time-out procedure. When the internal time-out procedure times out in 3 secons and the current weight is less than the threshold value, the program returns to the idle loop IDLE in FIG. 6A.

The subroutine in FIG. 6I is the subroutine for setting the objective weight of the dieter. This subroutine is activated in the timer loop TIMR of FIG. 6C following step 624. Upon the detection of a request for setting an objective weight by actuation of the objective weight switch 28, processing steps 700-712 are executed. A set weight time interval of one second is established in processing step 706 by setting the second counter so that for every second that the objective weight switch 28 is actuated, a set weight increment of 5 pounds is added to the displayed objective weight at processing step 705. This addition of 5 pound weight increments continues until the dieter stops actuating the objective weight switch 28. If the new objective weight is more than a predetermined limit away from the current weight, e.g., 20 pounds as established by processing step 707, the objective weight is not reset. If the dieter is trying to lose weight, a lose bit is set in step 709 and, if the dieter is trying to gain weight, this lose bit is rest in step 710. The dieter can also enter a desired time interval for the weight loss as described below, the processing of which would be accomplished in conjunction with the execution of the subroutine in FIG. 6I.

Another feature of the diet scale of the present invention is the measurement of the change in weight as a function of time. In the diet scale of FIG. 1, a time switch 58 is shown connected to the eight inputs P3-0 to P3-8 of the microcomputer 12. The time switch 58 may be a keyboard to enable the dieter to enter time information, such as the time interval of a diet program, into the random access memory of the microcomputer 12. Of course, this time information also could be entered by an advance button similar to the advance button of the weight objective switch 28 described above. Also, the time information could be automatically programmed in the microcomputer, such as a one month time interval, and then the dieter could actuate the time switch 58 to indicate the starting time of the diet program.

The time interval of the diet program which is entered by the dieter with the time switch 58 or automatically programmed in one microcomputer 12 is used by the microcomputer 12 to determine the projected weight of the dieter in accordance with the diet program at the time of the actual weighing and the deviation from the projected weight. The projected weight, as shown in step 914 of FIG. 8A, is the calculated weight of the dieter as a function of the elapsed time and objective weight of the diet program, i.e., the project weight equals the start weight plus a percentage of the objective weight loss or gain. The percentage is the percentage of the time interval of the diet program that has elapsed. This time interval information can also be used to determine the time period remaining in the diet program and the average weight loss per unit of time. However, in order to determine this additional information and generate the display several modifications must be made in the flow diagram.

Turning first to FIG. 6C, step 618 of the timer loop TIMR must be expanded to test both the set time objective switch 58 and the set weight objective switch 28 and an additional decrement counter must be added to the loop TIMR. These changes have been made in FIG. 7A which shows the steps 901-904 for testing to determine if the objective weight and time have been entered and steps 905-906 for actuating a third decrement counter. This third decrement counter is used in incrementing the current time value by transferring to the subroutine in FIG. 7B in the event the third decrement counter rolls to zero in step 906. In this manner, the clock of the microcomputer 12 continually updates the time value.

In addition, to the above changes, the idle loop IDLE in FIG. 6A must be slightly modified. Since a time function is being determined, the turn on of timer interrupts and turn on of the interrupt system in step 603 must be eliminated since the timers must continually run while the diet scale is in the inactive state in order to measure the time interval of the diet program. Similarly, the stop timer interrupt instruction of step 666 of FIG. 6H must be deleted.

Figure 8B:
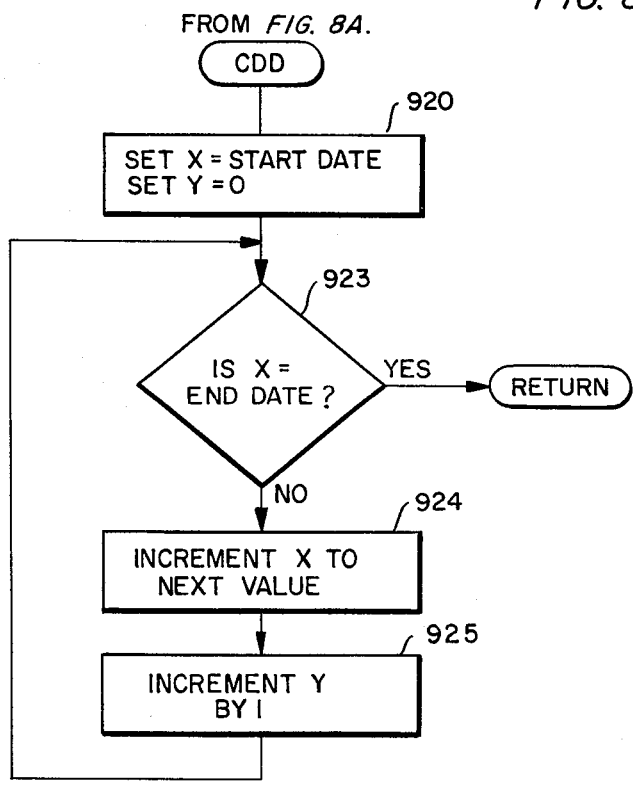

Referring now to steps 907-909 of FIG. 8A of the flow diagram, the difference between the start date and the current date is first calculated and stored in the random access memory. Then, the time interval of the diet program is calculated in steps 910-912 and used to determine the percentage of elapsed time since the start of the diet program. In both the above calculations, the subroutine CDD in FIG. 8B is called to calculate the difference by executing the steps 920-925. Finally, the projected weight and the deviation between the projected weight and the current weight are calculated and displayed in steps 913-919. A happy face flag is set if the dieter is achieving his objective of either losing or gaining weight and a happy face display on display device 30 is excited if the dieter is achieving his objective to thereby give positive reinforcement.

Although illustrative embodiments of the invention have been described in detail with reference to the accompanying drawings, it is to be understood that the invention is not limited to those precise embodiments and that various changes and modifications may be affected therein by one skilled in the art without departing from the scope or spirit of the invention. For example, in view of the compact nature of the diet scale of the present invention, it can be made as an executive diet scale for a briefcase. Also, various combinations of the calculations discussed above may be made by the microcomputer and displayed on the display. The diet scale could further be used to simply provide the current weight. In this regard, it is known in the art to provide an averaging to reduce fluctuations in measured current weight and such averaging techniques could be incorporated in the present invention by one skilled in the art. Finally, the flow diagrams of the program of the microcomputer are merely illustrative since numerous modifications would be apparent to those of skill. These and any other modifications are contemplated in the present invention.

I claim:

1. A diet scale having a weight progress indicator for indicating progress in a diet program comprising:
    weight measuring means for measuring the current weight of the dieter;
    memory means for storing an objective weight for the dieter and the time interval of the diet program;
    objective weight entry means coupled to said memory means for entering the objective weight in said memory means;
    objective time entry means coupled to said memory means for entering the time interval of the diet program in said memory means;
    processing means coupled to said memory means and responsive to the current weight for determining the projected weight of the diet program and the difference between the projected weight and the current weight, the projected weight being the calculated weight of the dieter as a function of the elapsed time and objective weight of the diet program; and
    display means connected to said processing means for displaying the difference between the projected weight and the current weight.

2. A diet scale according to claim 1 wherein said display means displays the projected weight.

3. A diet scale according to claim 1 wherein said memory means further stores a previous measurement of the weight of the dieter, said processing means further determines the difference between the previous measurement and the current weight and said display means further displays the difference between the previous measurement and the current weight.

4. A diet scale according to claim 3 wherein said display means further displays an indication of the direction of weight change.

5. A diet scale according to claim 1 wherein said memory means is responsive to said weight means to store the current weight.

6. A diet scale according to claim 5 wherein said processing means and said memory means are monolithic.

7. A diet scale according to claim 1 further comprising selector switch means connected to said processing means for identifying one of a plurality of dieters, said memory means storing an objective weight for each dieter.

8. A diet scale according to claim 7 wherein said processing means, said memory means and part of said weight measuring means is a microcomputer.

9. A diet scale according to claim 1 wherein said processing means is program responsive and said memory means stores the program.

10. A diet scale according to claim 1 wherein said objective weight entry means comprises a keyboard.

11. A diet scale according to claim 1 wherein said objective weight entry means comprises an automatic advance button.

12. A diet scale according to claim 1 wherein said objective weight entry means comprises switch means for conditioning said memory means to receive the objective weight from said weight measuring means in response to the dieter depressing said diet scale until the objective weight is reached and holding said diet scale at the objective weight for a fixed period of time.

13. A diet scale according to claim 1 wherein said weight measuring means measures weight in one pound increments.

14. A diet scale according to claim 1 wherein said weight measuring means measures fractional increments smaller than a pound.

15. A diet scale according to claim 1 wherein said weight measuring means comprises an optical weight sensor for reading the weight of a dieter.

16. A diet scale having a weight progress indicator for indicating progress in a diet program comprising:
    weight measuring means for measuring the current weight of the dieter;
    memory means for storing an objective weight for the dieter;
    objective weight entry means coupled to said memory means for entering the objective weight and time interval of the diet program in said memory means;
    processing means coupled to said memory means and responsive to said weight measuring means for determining the current weight measured by said measuring means, the projected weight of the diet program and the deviation between the projected weight and the current weight, the projected weight being the calculated weight of the dieter as a function of the elapsed time and objective weight of the diet program;

display means connected to said weight measuring means and said processing means for displaying the current weight of the dieter and the deviation between the projected weight of the diet program and the current weight.

17. A diet scale according to claim 16 further comprising selector switch means connected to said processing means for identifying one of a plurality of dieters, said memory means storing an objective weight for each dieter.

18. A diet scale according to claim 16 wherein said display means further displays the projected weight.

19. A diet scale according to claim 16 wherein said processing means is program responsive and said memory means stores the program.

20. A diet scale according to claim 19 wherein said processing means, said memory means and part of said weight measuring means is a microcomputer.

21. A diet scale according to claim 16 wherein said weight measuring means comprises an optical weight sensor for reading the weight of a dieter.

22. A diet scale having a weight progress indicator for indicating progress in a diet program comprising:

weight measuring means for measuring the current weight of the dieter;

memory means for storing an objective weight and the time interval of the diet program;

entry means for entering the objective weight of the dieter in said memory means;

processing means coupled to said memory means and responsive to said weight measuring means for determining the current weight, the projected weight of the diet program and the difference between the current weight and the projected weight of the diet program as a function of time, the projected weight being the calculated weight of the dieter as a function of the elapsed time and objective weight of the diet program; and display means connected to said processing means for displaying the current weight of the dieter and the difference between the current weight and the projected weight.

23. A diet scale according to claim 22 wherein said entry means further enters the time interval of the diet program.

24. A diet scale having a weight progress indicator for indicating progress in a diet program comprising:

weight measuring means for measuring the current weight of the dieter;

memory means for storing the objective weight and the time interval of the diet program;

processing means coupled to said memory means and said weight measuring means for determining weight change information, the weight change information being a function of the objective weight and the elapsed time of the time interval of the diet program;

display means connected to said processing means for displaying the weight change information.

25. A diet scale according to claim 24 wherein said processing means processes the objective weight and the time interval of the diet program stored in said memory means to determine weight change information which includes the deviation between the projected weight according to the diet program and the current weight, said display means further displaying the deviation between the projected weight and the current weight.

26. A diet scale according to claim 25 wherein the weight change information includes the projected weight and said display means displays the projected weight.

27. A diet scale according to claim 24 wherein said weight measuring means generates weight signals indicative of the current weight and said processing means determines the current weight from the weight signals, said display means further displaying the current weight.

28. A diet scale according to claim 24 further comprising objective weight entry means coupled to said memory means for entering the objective weight and the time interval of the diet program in said memory means.

29. A diet scale according to claim 24 wherein said memory means and said processing means are parts of a microcomputer.

* * * * *